April 10, 1928.

H. HEIDENHAIN 1,665,627

METHOD AND MEANS FOR DRYING FRUITS

Filed July 12, 1927

INVENTOR
Heinrich Heidenhain
BY
Frank Warren
ATTORNEY

Patented Apr. 10, 1928.

1,665,627

UNITED STATES PATENT OFFICE.

HEINRICH HEIDENHAIN, OF WENATCHEE, WASHINGTON.

METHOD AND MEANS FOR DRYING FRUITS.

Application filed July 12, 1927. Serial No. 205,089.

My invention relates to improvements in methods of, and means for, removing the moisture from fruits, as apples, pears, and the like, after they have been washed, preparatory to packing, and the object of my invention is to provide an improved method of, and improved means for, removing the moisture from the stem cavities and the calyx or blossom cavities, of the fruit after washing.

A more specific object is to devise a new method for removing the moisture from the calyx cavities and stem cavities of freshly washed fruit by subjecting said cavities to the simultaneous action of an air jet and a suction.

Other and more specific objects will be apparent from the following description taken in connection with the accompanying drawings.

When fruits, as apples, are washed, preparatory to packing, it is not possible, by ordinary drying methods, to remove all of the moisture from the stem cavity and calyx or blossom cavity. If this moisture is not removed it is detrimental to the fruit and tends to promote decay. It is the purpose of my invention to devise a cheap, practical and efficient method for removing this moisture.

In accordance with my invention I take the apples or other fruits that have been washed and first remove the moisture from the cheeks or sides of said fruits using any approved method of washing and drying. These methods usually or often leave moisture in the calyx and stem cavities of the fruits. To remove this moisture I subject each of the aforementioned cavities to the simultaneous action of an air jet and a suction, the air jet tending to loosen up the moisture and blow the same out of remote corners of the cavities and the suction picking up the moisture and carrying it away. In this manner I am able to remove substantially all of the moisture from the cavities, leaving the fruits in proper condition for packing.

The accompanying drawings illustrate, somewhat diagrammatically a preferred form of apparatus that may be used for carrying out my process but it will be understood that the invention is not to be restricted to the use of this form of apparatus.

In the drawings Figure 1 is a somewhat diagrammatic fragmentary view in elevation of apparatus that may be used in carrying out my invention.

Figure 1:
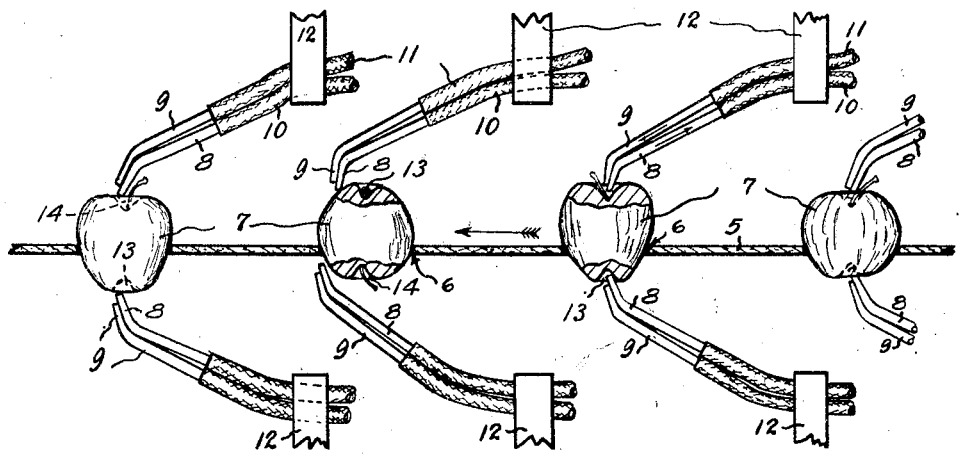

Referring to the drawings, throughout which like reference numerals designate like parts, 5 designates a moving belt which may be provided with holes 6 for the reception of fruit as apples 7. A plurality of duplex nozzle units are provided above and below the belt 5, each of said nozzle units comprising a tubular suction nozzle 8 and a tubular air jet nozzle 9, the tips of which are arranged in close proximity to each other and are made of such a shape and placed in such a position and at such an angle that they may slide on the surface of the apples and may drop into the cavities of the apples without hanging or hooking on. The size of the opening of the tip is usually about one thirty second of an inch but may be larger or smaller as required.

It is characteristic of my method that the blast and suction take place within close range of the object. As a matter of fact the suction pipe is touching the surface of the fruit at almost all times. By doing so, the moisture is removed effectively and economically and but little power is required to provide for the blast and the suction. Any method which attempted to dry the fruit by a blast of air delivered from greater distances would require a large volume of air, most of which would be wasted.

Obviously, fruit having only a calyx cavity can be placed on a carrier in a predetermined position and only one set of nozzles will be required to serve said fruit.

The nozzle members 8 and 9 are connected with flexible tubes 10 and 11 respectively, which may be of rubber, and which permit the nozzle members to move freely to automatically adjust themselves to the proper location on the fruit. The flexible tubes 10 and 11 may be supported by any suitable supporting means 12. Suitable means, not shown, are provided for forcing air through the tube 11 and producing a vacuum in the tube 10 so that a jet of air will be blown from one nozzle member and a suction will be produced through the other.

Figure 2:
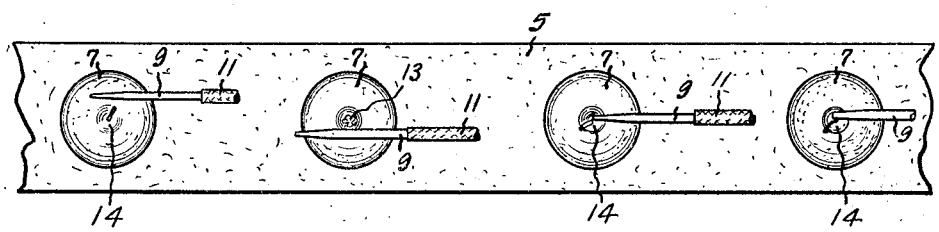
Fig. 2 is a fragmentary plan view of the same.

As the apples are moved between the upper and lower sets of nozzle units said nozzles will enter the calyx cavities 13 and stem cavities 14 of the apples and all moisture will be blown and sucked out of said cavities. Due to the fact that some apples are not regular in shape and to the fact that the apples are not always accurately placed in the holes in the belt I prefer to stagger the nozzle units as to position as shown in Fig. 2 so that if the calyx or stem cavity is not entered and served by the nozzle unit or units that are positioned in a mid plane it will be entered and served by those positioned to the right or left of the mid plane. By this arrangement, as much variation of position of the apple as may be desired may be provided for. The rubber tubes 10 and 11 support the nozzles yieldingly so that said nozzles may be freely moved sidewise or vertically to accommodate apples or other fruit of varying size and position. The nozzles are easily moved by contact with the fruit and will not damage or scar the fruit. When one of the nozzle units drops into a cavity in the fruit it will effectively remove all moisture from said cavity.

Figure 3:
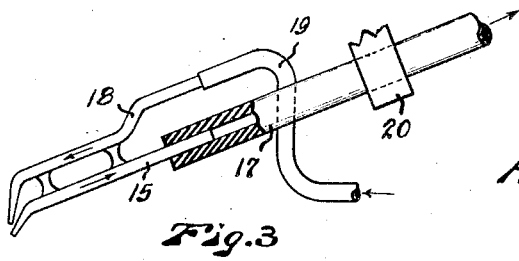
Fig. 3 is a detached view of a preferred form of drying nozzle.

In Fig. 3 I have shown a preferred form of nozzle embodying a suction tube 15 connected with a flexible conduit 17 and a jet tube 18 connected with a flexible conduit 19. The suction tube and jet tube are preferably rigidly connected together. The jet conduit 19 is of light flexible material and the suction conduit 17 is of heavier material. The nozzle is supported entirely and solely from the suction conduit tube 17 as by a support 20. This gives greater and more uniform flexibility in all directions than when both tubes are supported.

The operation of the invention will be fully understood from the foregoing description, the apples being placed on the belt, which preferably moves at constant speed are carried past the nozzle units which enter the cavities and remove all of the moisture from said cavities leaving the apples dry and ready for packing.

It will be obvious that the moisture, under some conditions, can be removed from some cavities by means of the suction nozzle, only, but where the cavities are of such shape and depth that the suction nozzle cannot reach the bottom thereof the air from the jet nozzle 9 will blow the moisture out of the depth of the cavity and raise it to a position where the suction in the nozzle 8 will carry it away.

The foregoing description and accompanying drawings clearly disclose a preferred embodiment of my invention but it will be understood that this disclosure is merely illustrative and that such changes may be resorted to as are fairly within the scope and spirit of the following claims.

What I claim:—

1. Fruit drying devices of the class described embodying a yieldingly supported suction nozzle capable of entering cavities in the surfaces of fruits and means for progressively moving the fruits into engagement with the vacuum nozzle.

2. Fruit drying devices, embodying a duplex nozzle arranged for simultaneously delivering a jet of air and producing a suction, means yieldingly supporting said nozzle and means for progressively moving fruit past said nozzle in a manner whereby the nozzle will be caused to enter the cavities at the location of the calyx and stem of the fruit.

3. In fruit drying devices of the class described, a moving belt having holes for receiving and holding globular fruit, whereby one side of the fruit is exposed on each side of the belt, a plurality of vacuum nozzles disposed on opposite sides of the belt, and tube means for flexibly supporting said nozzles in contact with the fruit whereby the nozzles will be caused to enter the cavities in the blossom and stem ends of the fruit as the fruit is moved past the nozzles.

4. In fruit drying devices of the class described, a moving belt adapted to receive and hold globular fruit with one side of the fruit exposed on each side of the belt, a plurality of combined suction and air jet nozzles arranged on opposite sides of said belt, and flexible tube means flexibly supporting said nozzles in the path of movement of the fruit whereby the suction and air discharge ends of the nozzles will be caused to enter the cavities in the blossom and stem ends of the fruit as the fruit is moved progressively past the nozzles.

In witness whereof, I hereunto subscribe my name this 5th day of July, A. D. 1927.

HEINRICH HEIDENHAIN.